United States Patent
Zhang et al.

(10) Patent No.: US 9,479,260 B2
(45) Date of Patent: Oct. 25, 2016

(54) SINGLE CARRIER FLEXIBLE BIT RATE TRANSCEIVER FOR COHERENT OPTICAL NETWORK

(71) Applicant: Futurewei Technologies, Inc., Plano, TX (US)

(72) Inventors: Zhuhong Zhang, Ottawa (CA); Chuandong Li, Ottawa (CA); Zhiping Jiang, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 159 days.

(21) Appl. No.: 14/269,615

(22) Filed: May 5, 2014

(65) Prior Publication Data

US 2015/0372762 A1  Dec. 24, 2015

Related U.S. Application Data

(60) Provisional application No. 61/819,322, filed on May 3, 2013.

(51) Int. Cl.
| | |
|---|---|
| H04B 10/516 | (2013.01) |
| H04B 10/60 | (2013.01) |
| H04L 1/00 | (2006.01) |
| H04B 10/69 | (2013.01) |
| H04B 10/079 | (2013.01) |
| H04B 10/40 | (2013.01) |

(52) U.S. Cl.
CPC .... *H04B 10/5161* (2013.01); *H04B 10/07953* (2013.01); *H04B 10/40* (2013.01); *H04B 10/69* (2013.01); *H04L 1/0003* (2013.01)

(58) Field of Classification Search
CPC .................................................. H04B 10/5161
See application file for complete search history.

(56) References Cited

U.S. PATENT DOCUMENTS

| | | | | |
|---|---|---|---|---|
| 2008/0232449 A1* | 9/2008 | Khan | ........... | H04L 25/03343 375/220 |
| 2010/0150577 A1* | 6/2010 | Essiambre | ......... | H04B 10/5561 398/188 |
| 2010/0329683 A1* | 12/2010 | Liu | .................... | H04B 10/2513 398/81 |
| 2011/0075651 A1* | 3/2011 | Jia | ........................ | H04B 7/0671 370/344 |
| 2011/0103794 A1* | 5/2011 | Gottwald | ............ | H04L 27/2602 398/58 |
| 2011/0228878 A1* | 9/2011 | Sorrentino | ............ | H04L 5/0007 375/295 |
| 2012/0243876 A1* | 9/2012 | Tang | .................... | H04B 10/548 398/135 |

(Continued)

OTHER PUBLICATIONS

Roberts, K., et al., "Flexible Transceivers," ECOC Technical Digest, 2012, OSA, 3 pgs.

(Continued)

*Primary Examiner* — Nathan Curs
(74) *Attorney, Agent, or Firm* — Conley Rose, P.C.; Grant Rodolph; Jonathan K. Polk (57) ABSTRACT

An apparatus comprising a digital signal processor (DSP) configured to code a plurality of data sub-streams using a plurality of modulation formats to generate a plurality of coded data symbols, wherein each modulation format leads to a unique bit rate for coded data symbols associated with a modulation format, transform the coded data symbols into a frequency domain by applying Fourier transform on each coded data symbol, map the frequency-transformed data symbols onto a plurality of subcarrier signals associated with a plurality of frequency tones, wherein at least two of the subcarrier signals correspond to different modulation formats, and generate an electrical signal in a time domain based on the subcarrier signals.

7 Claims, 5 Drawing Sheets

(56) References Cited

U.S. PATENT DOCUMENTS

| | | | |
|---|---|---|---|
| 2013/0083705 A1* | 4/2013 | Ma | H04B 7/024 370/280 |
| 2013/0182671 A1* | 7/2013 | Kakishima | H04B 7/0417 370/329 |
| 2013/0216231 A1* | 8/2013 | Yang | H04B 10/5161 398/79 |
| 2013/0272698 A1* | 10/2013 | Jin | H04L 27/2628 398/43 |
| 2014/0056583 A1* | 2/2014 | Giddings | H04L 27/2663 398/44 |
| 2014/0099116 A1 | 4/2014 | Bai et al. | |
| 2014/0341587 A1* | 11/2014 | Nakashima | H04B 10/2572 398/115 |

OTHER PUBLICATIONS

Saunders, "Coherent DWDM Technology for High Speed Optical Communications," Optical Fiber Technology, Elsevier, www.elsevier.com/locate/yofte, vol. 17, 2011, pp. 445-451.

* cited by examiner

SINGLE CARRIER FLEXIBLE BIT RATE TRANSCEIVER FOR COHERENT OPTICAL NETWORK

CROSS-REFERENCE TO RELATED APPLICATIONS

The present application claims benefit of U.S. Provisional Patent Application No. 61/819,322 filed May 3, 2013 by Zhuhong Zhang and entitled "Single Carrier Flexible Bit Rate Transceiver for Coherent Optical Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used today for data communication. Optical communication systems may employ optical fibers as the transmission medium to support high data rates in long distance transmissions (e.g. long haul optical systems). Continuous demands for increased optical network capacities provide challenges for current and future network designs. Flexible and adaptive networks equipped with flexible transceivers and network elements that can adapt to traffic needs may meet these challenges. In a flexible optical transceiver, an optical transmitter and receiver may be software-programmable, which may allow various transmission schemes or modulation formats, data rates, forward-error correction (FEC) protocols, and number of subcarriers to be configured. The optical transmitter and receiver may be set up to make the best use of the available channel bandwidth. This may mean trading capacity for reach based on modifying the amount of information placed on a carrier. Accordingly, flexible transceivers may be useful subsystem elements for current and future optical networks.

In development of optical communication networks or systems, flexible grid (flex-grid) and flexible rate (flex-rate) are two industrial trends for realizing flexible optical networks. Compared to the flex-grid approach that may need network structural changes, the flex-rate approach on a fixed-grid network may sometimes be more attractive. Existing flex-rate techniques may be based on modulation format changes that have limited granularity, that is, the minimal adjustable data rate of an optical signal may be relatively big. Thus, it may be desirable to improve the granularity to obtain more operable data rates.

SUMMARY

In one embodiment, the disclosure includes, at a transmitting side of an optical communication network, an apparatus comprising a digital signal processor (DSP) configured to code a plurality of data sub-streams using a plurality of modulation formats to generate a plurality of coded data symbols, wherein each modulation format leads to a unique bit rate for coded data symbols associated with a modulation format, transform the coded data symbols into a frequency domain by applying Fourier transform on each coded data symbol, map the frequency-transformed data symbols onto a plurality of subcarrier signals associated with a plurality of frequency tones, wherein at least two of the subcarrier signals correspond to different modulation formats, and generate an electrical signal in a time domain based on the subcarrier signals.

In another embodiment, the disclosure includes, at a receiving side of an optical communication network, an apparatus comprising a frontend configured to receive an optical signal modulated on a single optical carrier, and generate a digital electrical signal based on the optical signal, and one or more processors coupled to the frontend and configured to transform the digital electrical signal from a time domain to a frequency domain by applying Fourier transform to generate a plurality of subcarrier signals, generate a plurality of coded data symbols in the time domain based on the subcarrier signals, wherein generating the coded data symbols comprises applying inverse Fourier transform on each subcarrier signal, and decode the coded data symbols using a plurality of demodulation formats to generate a plurality of decoded data sub-streams, wherein different demodulation formats are applied on coded data symbols with different bit rates per symbol.

In yet another embodiment, the disclosure includes a method of optical communication comprising receiving an optical signal modulated on a single optical carrier, generating a digital electrical signal based on the optical signal, transforming the digital electrical signal from a time domain to a frequency domain by applying Fourier transform to generate a plurality of subcarrier signals, generating a plurality of coded data symbols in the time domain based on the subcarrier signals, wherein generating the coded data symbols comprises applying inverse Fourier transform on each subcarrier signal, and decoding the coded data symbols using a plurality of demodulation formats to generate a plurality of decoded data sub-streams, and wherein different demodulation formats are applied on coded data symbols with different bit rates per symbol.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of an optical communication network comprising a flexible bit rate transmitter and receiver (e.g., a transceiver). The disclosed embodiments may increase bit rate granularity and may be based on the digital realization of a modulated single optical carrier with multi-modulated tones. Unlike existing flexible transceivers that may only support a limited granularity with flexible bit rates at R, 2R, 3R, and 4R (R is a minimum adjustable rate corresponding to binary phase shift keying (BPSK), which has the lowest symbol bit rate (one bit per symbol for BPSK), the disclosed technique provides an extra dimension on flex-rate granulates by changing modulation on some tones but not others. Thus, for N modulated tones in one optical carrier, the minimum adjustable bit rate may become R/N. The multi-modulated tones may be spectral shaped with fast roll-off and near baud rate spaced. Further, the present disclosure teaches embodiments for estimation of frequency offset for a local oscillator (LO) by accumulating the power of the frequency bins around a spectral gap position. Moreover, the present disclosure teaches embodiments for optical signal to noise ratio (OSNR) monitoring based on the power of the frequency bins.

Figure 1:
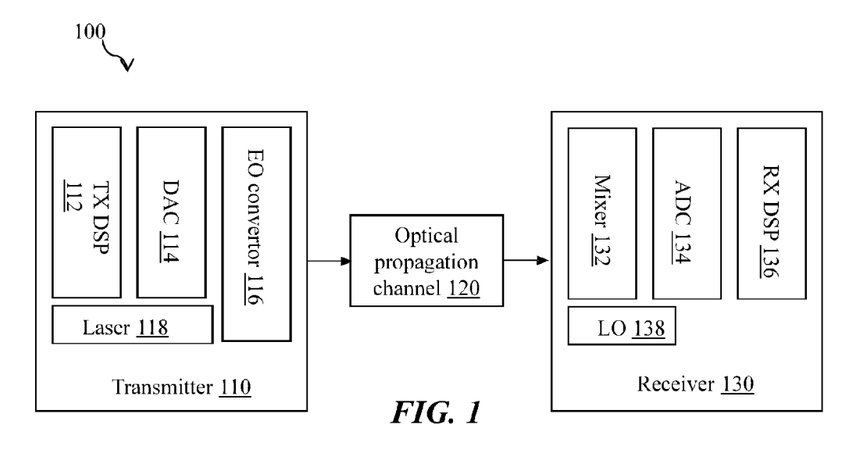
FIG. 1 is a schematic diagram of an embodiment of an optical coherent transportation link.

FIG. 1 illustrates an embodiment of an optical coherent transportation link 100, which may be part of an optical communication network. The optical coherent transportation link 100 may comprise a transmitter (TX) 110, an optical propagation channel 120, and a coherent receiver (RX) 130 communicatively coupled through an optical propagation channel 120. The transmitter 110 is located on a transmitting side of the optical communication network and may be configured to send optical signals through the optical propagation channel 120 to the receiver 130 located on a receiving side of the optical communication network. Depending on whether data communication is downstream or upstream, the transmitter 110 and the receiver 130 may be located at a central office (CO) side or a customer premise side. For example, in downstream communication, the transmitter 110 may reside at the CO side, while the receiver 130 may reside at the customer premise side. In practice, an apparatus may comprise both transmitter and receiver to facilitate bi-directional data communications. For instance, a customer premise equipment (CPE) may comprise a transmitter (e.g., the transmitter 110) for upstream communication and a receiver (e.g., the receiver 130) for downstream communication, although in such case the transmitter and receiver configuration is different from FIG. 1 because they work in different directions. Further, although an optical network is used as an exemplary, it should be understood that embodiments disclosed herein may be used in other communication systems, such as digital subscriber line (DSL) systems, which may implement discrete multi-tone (DMT)) modulation and demodulation.

The transmitter 110 may comprise a DSP 112 (denoted as TX DSP), one or more digital-to-analog convertors (DAC) 114, and an electrical-to-optical (EO) convertor 116, and a laser 118. EO components may modulate electrical signals onto an optical carrier provided by the laser 118. For example, baseband modulated signal may be added by the EO convertor 116 to the optical carrier. An optical signal transmitted by the transmitter 110 may comprise, for example, two orthogonal linear polarization components denoted as X and Y. Each component may comprise two orthogonal phase components, denoted as in-phase (I) and quadric-phase (Q), that may have the same optical carrier frequency. The carrier frequency may be an optical wavelength supplied by the laser 118 with phase noise.

The optical propagation channel 120 may comprise optical filters such as cascaded wavelength-selective switches (WSSs), fiber, amplifiers, and other components. The channel 120 may be the sources of chromatic dispersion (CD), nonlinear phase noise, polarization mode dispersion (PMD), polarization dependent loss (PDL), polarization dependent gain, polarization rotation and optical white Gaussian noise.

The coherent receiver 130 may comprise a mixer 132, one or more analog-to-digital converters (ADCs) 134, a DSP unit 136 (denoted as RX DSP), and a LO 138. The mixer 132 may convert optical signals to electrical signals. In the integrated coherent receiver 130, the LO 138, with a frequency that may be closely matched to the transmitter 110, may mix with a propagated optical signal and split the propagated optical signal into four signals with each split signal being a mixture of transmitted signals. The DSP unit 136 may process signals and recover data.

Figure 2A:
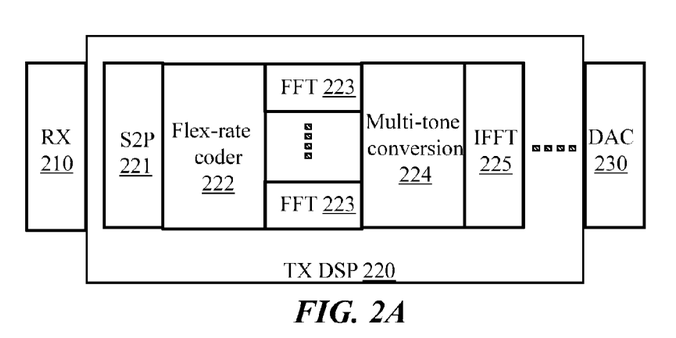
FIG. 2A is a schematic diagram of an embodiment of units or components at a transmitting end of the optical coherent transportation link.

FIG. 2A illustrates an embodiment of units or components at a transmitting end (e.g., with the transmitter 110). The transmitting end may comprise a receiver 210, a TX DSP 220, and a DAC 230 arranged as shown in FIG. 2A. The receiver 210 may receive an input data stream, which may be from any suitable network device. The TX DSP 220, which may be similar to the DSP 112, may comprise units including a serial-to-parallel (S2P) conversion unit 221, a flex-rate coding unit 222, a plurality of fast Fourier transform (FFT) units 223, a multi-tone conversion unit 224, and an inverse FFT (IFFT) unit 225. The serial-to-parallel conversion unit 221 may convert the input data stream into N data sub-streams, where N is a positive integer. Each of the N data sub-streams may have the same data rate or different data rates.

In an embodiment, the flex-rate coding unit 222 may code or map the data sub-streams with a plurality of modulation formats to generate a plurality of coded data symbols. For example, the plurality of modulation formats may include BPSK, quadrature phase shift keying (QPSK), 8-level quadrature amplitude modulation (8QAM), 16QAM, 32QAM, 64QAM, other modulation formats known in the art, and combinations thereof. Each modulation format may have various forms, e.g., with QPSK including polarized multiplexed-QPSK (PM-QPSK). Each modulation format may lead to a unique bit rate for coded data symbols associated with a modulation format. For example, BPSK, QPSK, 8QAM, and 16QAM lead to symbol bit rates of one, two, three, and four, respectively. Each of the coded sub-streams may be transformed from a time domain to a frequency domain in a discrete FFT unit 223. In the frequency domain, sub-streams may be converted by the multi-tone conversion unit 224 to multi-tones or multi-subcarriers.

Further, each data sub-stream may be filtered for spectrum shaping purposes. The output of the multi-tone conversion unit 224 may be connected to a portion of the IFFT unit 225, which may have enough number of taps to incorporate N data sub-streams and spectral gaping among the N data sub-streams. At the output of the IFFT unit 225, the spectrum of modulated signals may have N modulated frequency tones, and the bandwidth may match the data rate of the input data stream.

In an embodiment, the flex-rate coder 222 may be configured to code a plurality of data sub-streams using a plurality of modulation formats to generate a plurality of coded data symbols. Further, the flex-rate coder 222 may adjust a data rate of the optical signal by changing at least some of the modulation formats used in coding the data sub-streams. The data rate may be expressed in any form such as payload bit rates, traffic rates, throughputs, etc. In an embodiment, a minimum adjustable data rate of the optical signal equals the data rate of the optical signal divided by a number of modulated frequency tones corresponding to the single optical carrier. Details are further discussed below.

The FFT units 223 may transform the coded data symbols into a frequency domain by applying a Fourier transform on each coded data symbol. The multi-tone conversion unit 224 may map the frequency-transformed data symbols onto a plurality of subcarrier signals associated with a plurality of frequency tones. In an embodiment, at least two of the subcarrier signals correspond to different modulation formats to achieve flex-rate capabilities. The DAC 230 may generate an analog electrical signal in a time domain based on the subcarrier signals. Since there may be intermediate processing from the subcarrier signals to the analog electrical signal, such as digital to analog conversion, the term "based on" used in the present disclosure may generally encompass various scenarios including directly/indirectly based on and wholly/partially based on. Although not shown in FIG. 2A, a frontend or section may convert the electrical signal to an optical signal, e.g., by using EO converter 116. Converting the electrical signal may comprise modulating the electrical signal onto a single optical carrier for the optical signal. The optical signal may then be transmitted to a receiving side.

Figure 2B:
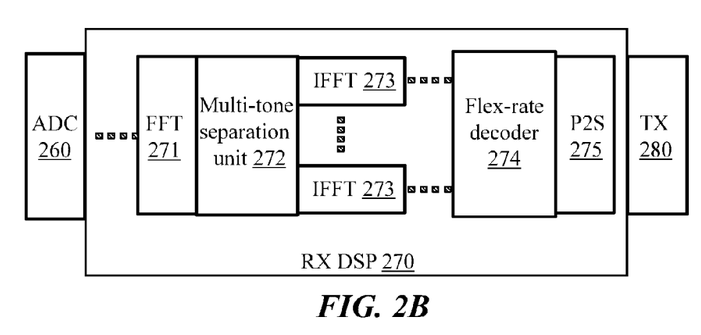
FIG. 2B is a schematic diagram of an embodiment of components at a receiving end of the optical coherent transportation link.

FIG. 2B illustrates an embodiment of blocks, modules, or components at a receiving end (e.g., with the receiver 130). The receiving end may comprise an ADC unit 260, a RX DSP 270, and a transmitter 280 arranged as shown in FIG. 2B. The RX DSP 270, which may be similar to the DSP 136, may comprise units including an FFT unit 271, a multi-tone separation unit 272, a plurality of IFFT units 273, a flex-rate decoder or decoding unit 274, and a parallel-to-serial (P2S) conversion unit 275. In the ADC unit 260, a received signal may be converted to digitized sample streams at an ADC sampling rate. The sample stream may then be converted or transformed to a frequency domain by the FFT unit 271. In the frequency domain, sample streams may be separated with respect to multi-tone frequency in the multi-tone separation unit 272, where frequency bins may be accordingly grouped to N groups and filtered for matching filter. Further, in the frequency domain, dispersion compensation may be conducted by a chromatic dispersion compensation (CDC) block. Then, frequency-transformed signals may be connected to N IFFT units 273, each of which may have a relatively smaller number of taps. The spectral bandwidth of the digital samples at the output of the IFFT units 273 may match the bandwidth of each modulated tone and the data rate of data sub-streams. The N sample sub-streams from the IFFT units 273 may be processed and decoded accordingly in the flex-rate decoding unit 274. Output of the flex-rate decoding unit 274 may be combined by the parallel-to-serial conversion unit 275.

In an embodiment, the coherent receiver may be configured to receive an optical signal modulated on a single optical carrier. A frontend including the ADC unit 260 may generate a digital electrical signal based on the optical signal. The FFT units 271 may transform the digital electrical signal from a time domain to a frequency domain by applying a Fourier transform to generate a plurality of subcarrier signals. In the frequency domain, the multi-tone separation unit 272 may separate frequency bands for the single carrier signal. Estimation of FO and OSNR may also be conducted in the frequency domain. The IFFT units 273 may generate a plurality of coded data symbols in the time domain based on the subcarrier signals, e.g., by applying inverse Fourier transform on each subcarrier signal. The flex-rate decoder 274 may decode the coded data symbols using a plurality of demodulation formats to generate a plurality of decoded data sub-streams. It should be understood that different demodulation formats may be applied on coded data symbols with different symbol bit rates, and that each demodulation format at the receiving side may correspond to a modulation format used at a transmitting side. For example, demodulation formats may include QPSK demodulation, QPSK demodulation, 8QAM demodulation, and 16QAM demodulation, and others known in the art, and combinations thereof.

Unlike existing flexible transceivers that support a flexible bit rate covering R, 2R, 3R, and 4R, where R is the bit rate with BPSK format and is the minimum adjustable rate, the disclosed embodiments provide an extra dimension on flex-rate granulates. In an embodiment, a minimum adjustable bit rate may become R/N (instead of R) for N modulated tones for a single optical carrier. Table 1 shows an embodiment of modulation scheme, where the number of tones N=2 serves as an example:

TABLE 1

| | Tone 2 | | | |
|---|---|---|---|---|
| | BPSK | QPSK | 8QAM | 16QAM |
| Tone 1 | | Bit Rate | | |
| BPSK | R | 1.5R | 2R | 2.5R |
| QPSK | 1.5R | 2R | 2.5R | 3R |
| 8QAM | 2R | 2.5R | 3R | 3.5R |
| 16QAM | 2.5R | 3R | 3.5R | 4R |

As shown in Table 1, by changing Tone 1 from BPSK to QPSK while not changing Tone 2, one may change the data rate by 0.5R. Thus, a TX DSP may adjust a data rate of a single-carrier optical signal by changing at least some of a plurality of modulation formats used in coding data sub-streams. In an embodiment, a minimum adjustable data rate (R/N) of the optical signal equals the data rate of the optical signal (e.g., R) divided by a number of modulated frequency tones (e.g., N) corresponding to the single optical carrier.

Figure 3A:
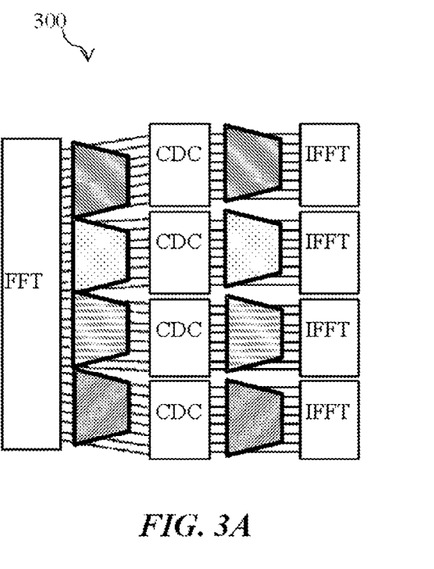
FIG. 3A is a schematic diagram of an embodiment of a multi-modulated-tone separation scheme with a relatively small frequency offset (FO).
Figure 3B:
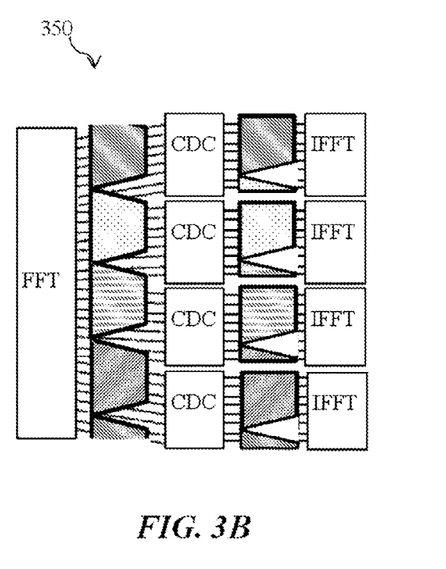
FIG. 3B is a schematic diagram of an embodiment of a multi-modulated-tone separation scheme with a relatively large FO.

When implementing a multi-modulated-tone system, one may control accuracy of FO estimation between the received signal and the LO. To demonstrate FO effects at the receiving side, FIG. 3A illustrates an embodiment of a multi-modulated-tone separation scheme 300 with a relatively small FO, and FIG. 3B illustrates an embodiment of a multi-modulated-tone separation scheme 350 with a relatively large FO. As shown in FIG. 3A, the multi-modulated-tone separation scheme 300 may be performed in a frequency domain with physical wire connections in an application-specific integrated circuit (ASIC). Digital shifting or analog shifting can be used to move tones to the right position. As shown in FIG. 3B, the large FO may directly impact the performance by introducing distortion due to improper sliced spectral of desired signal and by increasing cross talk from adjacent tone. This issue may be solved by having accurate FO estimation for tuning LO frequency through an auto frequency control (AFC) loop and pre-engineered spectral gap between multiple tones. The gaps may tolerate fast LO frequency drifting or wandering, which may not be tracked by AFC but may be tracked by a downstream DSP after the IFFT unit.

Figure 4A:
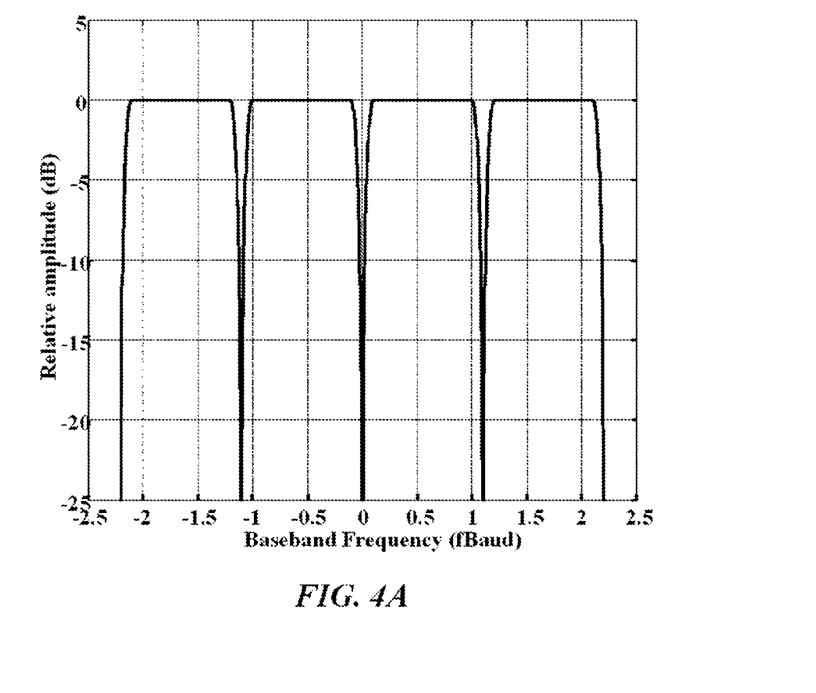
FIGS. 4A and 4B are exemplary spectrum plots of a single carrier with four modulated tones.
Figure 4B:
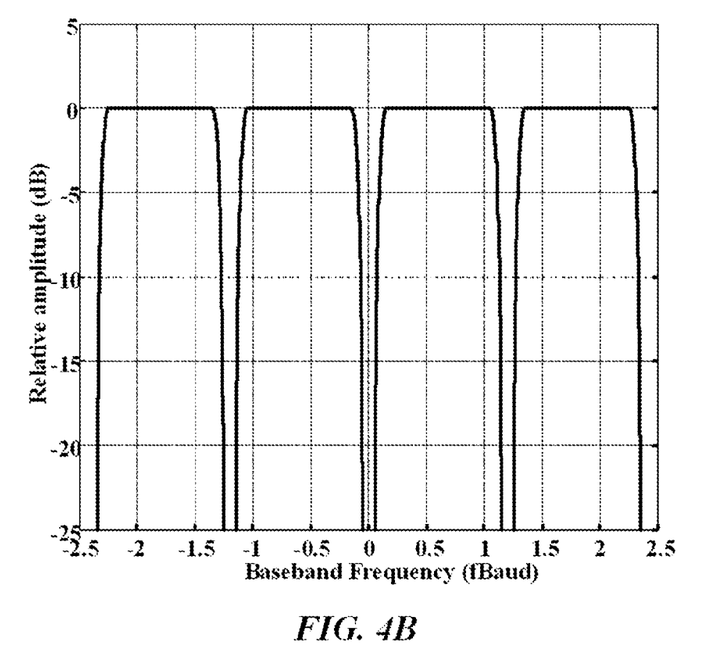

For single carrier systems with multi-modulated-tones, the requirement on FO may depend on the spectral shaping of the modulated tones and the spectral spacing among the multi-tones. FIGS. 4A and 4B illustrate exemplary spectrum plots of a single carrier with four modulated tones, although any number of modulated tones may be used in a single carrier system. As shown in FIGS. 4A and 4B, a frequency spectrum associated with the subcarrier signals may comprise four frequency bands separated by spectral gaps, and each frequency band may comprise a plurality of frequency bins (not shown in detail). FIG. 4A illustrates a baseband spectrum of four modulated tones that are square-root-cosine shaped with a roll off factor about $\alpha=0.1$ and are spaced at g times $f_{Baud}$ (i.e., $g*f_{Baud}$), where $f_{Baud}$ may be the baud rate of the modulated tone and g=1.1. FIG. 4B illustrates a baseband spectrum of four modulated tones for about $\alpha=0.1$ and g=1.2. As an example, if the baud rate of each modulated tone is about 10 gigahertz (GHz), a signal bandwidth will be about 44 GHz in FIG. 4A with an FO tolerance less than 1 GHz for g=1.1 spaced tones, and a signal bandwidth will be about 48 GHz in FIG. 4B with less than about 2 GHz FO tolerance for g=1.2 spaced tones.

A general expression of a discrete FFT may be given by equation:

$$X(k) = \sum_{n=0}^{N-1} x(n) e^{-j2\pi kn/N},$$

$$k = 0, 1, 2, \ldots, N-1,$$

where x(n) may be a sequence of discrete time samples, and N may be the number of FFT taps or the number of equally-spaced discrete frequencies.

In the presence of FO, the equation above may become:

$$X(k) = \sum_{n=0}^{N-1} x(n) e^{-j2\pi(k+m)n/N},$$

$$k = 0, 1, 2, \ldots, N-1,$$

where m may measure FO in term of number of frequency bins.

Figure 4C:
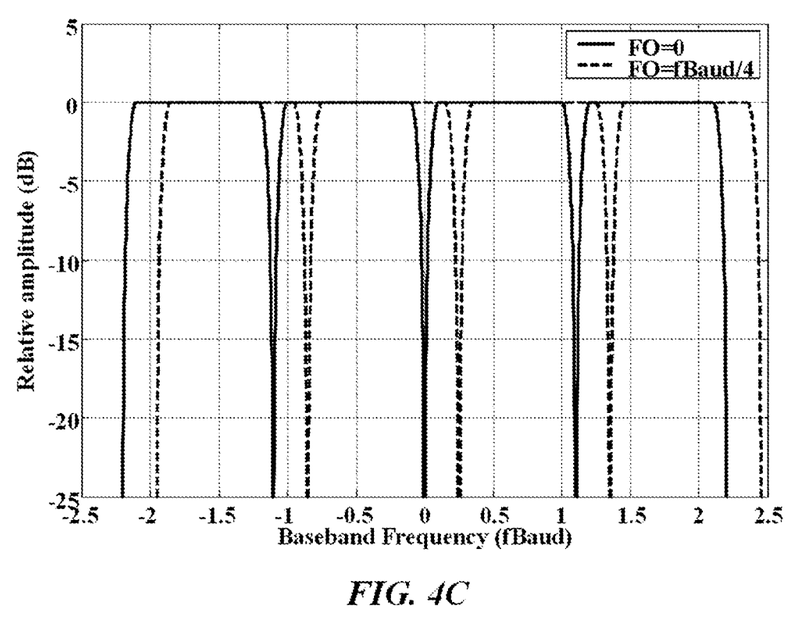
FIG. 4C is an exemplary spectrum plot showing a signal with two different FO values.

For multi-modulated-tone signals, the position of a spectral gap may be affected by FO. For example, if a sampling rate at the FFT input is fs, the frequency grid may be $f_{grid}=fs/N$. An FO of dF may move the spectral gap from a frequency bin position k0 to $k0+dF/f_{grid}$, where fgrid is known and dF/fgrid represents a number of frequency bin shifted away from position k0. By measuring dF/fgrid, the value of FO (dF) may be obtained. FIG. 4C illustrates an exemplary spectrum plot showing a signal with an FO=0 and another FO=$f_{Baud}/4$. The positions of spectral gaps are moved laterally along the baseband because of the change in FO.

The disclosed FO monitoring or estimation method may be based on a spectrum feature of multi-modulated-tone signals. In an embodiment, the receiver may estimate a FO for a LO based on a power of one or more frequency bins around a spectral gap position of a frequency band. By accumulating the power of frequency bins around the gap position of each FFT cycle, FO can be obtained or estimated. For multi-modulated-tone signals that have a spectral gap located at bin denoted as k0, the number of frequency bins for power accumulation may be computed as $2*dF/f_{grid}$ and may be centered around k0. In an embodiment, a spectral gap may comprise a plurality of frequency bins including a first frequency bin and a second frequency bin, where the first frequency bin may be a default bin (denotable as k0) by design indicating a frequency position of the spectral gap when FO is zero, and the second frequency bin with a minimum power among frequency bins in the spectral gap may indicate a frequency position of spectral gap with the presence of FO. The FO may be estimated to be a frequency difference between the first frequency bin (k0) and the second frequency bin. For example, if the second frequency bin with minimum power is at bin m0, then the FO may be determined as $(k0-m0)*f_{grid}$.

While modulated tones may have different modulation formats, carrier to noise ratio (CNR) or sub-carrier to noise ratio, and OSNR may be performance metrics that need to be monitored. The monitoring method disclosed herein may be based on the spectrum feature of multi-modulated-tone signals. For a single-carrier system, sometimes it may be difficult to distinguish optical noise from electrical noise during E/O and DA conversion, channel nonlinearity. However, by analyzing multi-subcarriers with gaps, power of frequency bins detected inside the gap may have come from an optical noise. Thus, one may integrate received signal multi-tones and compare the integrated power inside the gap to estimate the OSNR.

In an embodiment, OSNR may be determined based on accumulation of the power of frequency bins between two gaps surrounding a frequency band. By accumulating the power of frequency bins between (and including) two gaps surrounding one modulated tone, OSNR may be determined using the follows equations:

$$E = g \times f_{Baud}/f_{grid},$$

$$I_1 = 0.5 \times (g-1) \times f_{Baud}/f_{grid},$$

$$I_2 = 0.5 \times (g+1) \times f_{Baud}/f_{grid},$$

$$CNR = \sum_{i=I_1}^{I_2} (P(i) - P(1))\Big/(P(1) + P(E)/2/f_{grid},$$

$$OSNR = \frac{N}{12.5 \times 10^9} \times CNR,$$

where $f_{baud}$ may be the bandwidth of a frequency band for a modulated tone, $f_{grid}$ may be the bandwidth of a frequency bin in frequency domain, g (e.g., with values between 0 and 1) may be a spectral spacing factor of modulated tones, E may represent the frequency bin position of a gap, $I_1$ and $I_2$ may represent the start and end of a modulated tone, N may be the number of modulated tones, and P(i) may be the power of an i-th frequency bin (e.g., the first frequency bin may be at k0).

Figure 5:
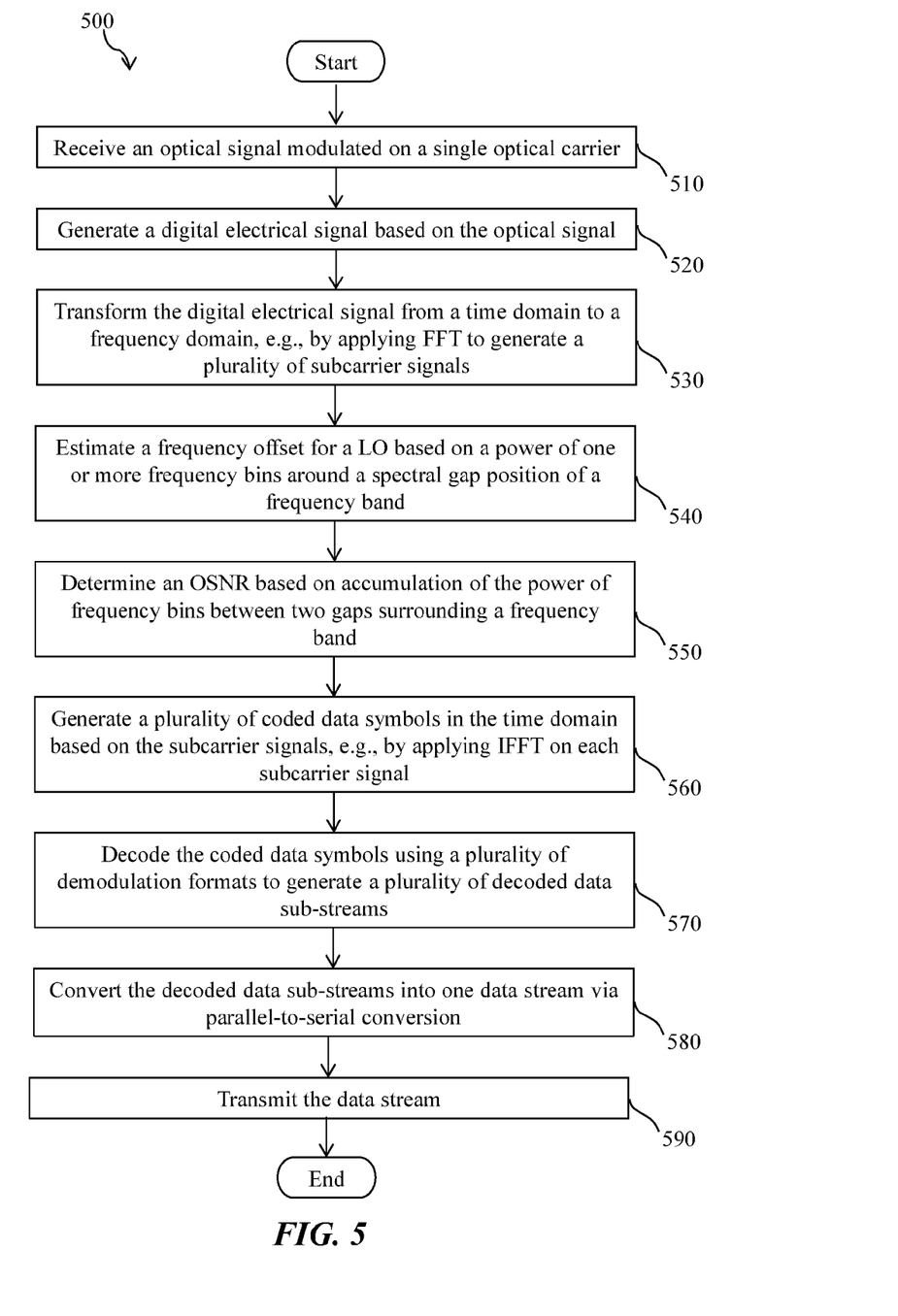
FIG. 5 is a flowchart illustrating an embodiment of an optical communication method.

FIG. 5 is a flowchart illustrating an embodiment of an optical communication method 500, which may be implemented by a receiving side (e.g., the receiver 130) of an optical communication network. If desired, the method 500 may also include steps implemented by a transmitting side (e.g., the transmitter 110) of the optical communication network. In step 510, the method 500 may receive an optical signal modulated on a single optical carrier. In step 520, the method 500 may generate a digital electrical signal based on the optical signal. Since there may be intermediate processing from the optical signal to the digital electrical signal, such as O/E conversion and AD conversion, the term "based on" used in the present disclosure may generally encompass various scenarios including directly/indirectly based on and wholly/partially based on. In step 530, the method 500 may transform the digital electrical signal from a time domain to a frequency domain, e.g., by applying FFT to generate a plurality of subcarrier signals.

In an embodiment, a frequency spectrum associated with the subcarrier signals may comprise a plurality of frequency bands separated by spectral gaps, and each frequency band may comprise a plurality of frequency bins. In step 540, the method 500 may determine or estimate a frequency offset for a LO based on a power of one or more frequency bins around a spectral gap position of a frequency band. In an embodiment, determining the frequency offset comprises accumulating the power of the frequency bins around the spectral gap position. For example, a spectral gap may comprise a first frequency bin (e.g., k0) at the center of the spectral gap and a second frequency bin (e.g., m0) with a minimum power among frequency bins in the spectral gap. In this case, the frequency offset may be a frequency difference ((k0−m0)*$f_{grid}$) between centers of the first frequency bin and the second frequency bin. In step 550, the method 500 may determine an OSNR based on accumulation of the power of frequency bins between two gaps surrounding a frequency band. Steps 540 and 550 may offer useful information for subsequent steps, but they may be skipped if desired.

In step 560, the method 500 may generate a plurality of coded data symbols in the time domain based on the subcarrier signals, e.g., by applying IFFT on each subcarrier signal. The estimated frequency offset from step 540 may be used in generating the coded data symbols. In step 570, the method 500 may decode the coded data symbols using a plurality of demodulation formats to generate a plurality of decoded data sub-streams. In an embodiment, different demodulation formats are applied on coded data symbols with different symbol bit rates. Each of the plurality of demodulation formats at the receiving side may correspond to one of a plurality of modulation formats used at a transmitting side.

In step 580, the method 500 may convert the decoded data sub-streams into one data stream via parallel-to-serial conversion. In step 590, the method 500 may transmit the data stream. It should be understood that FIG. 5 is for illustration purposes only, thus its steps can be modified and additional steps may be added wherever necessary. The method 500 may further include steps implemented at a transmitting side of optical communication. In an embodiment as shown in Table 1, the method 500 may adjust a data rate of the optical signal at the transmitting side by changing at least some of a plurality of modulation formats used in coding data sub-streams. A minimum adjustable data rate of the optical signal may equal the data rate of the optical signal divided by a number of modulated frequency tones corresponding to the single optical carrier.

Figure 6:
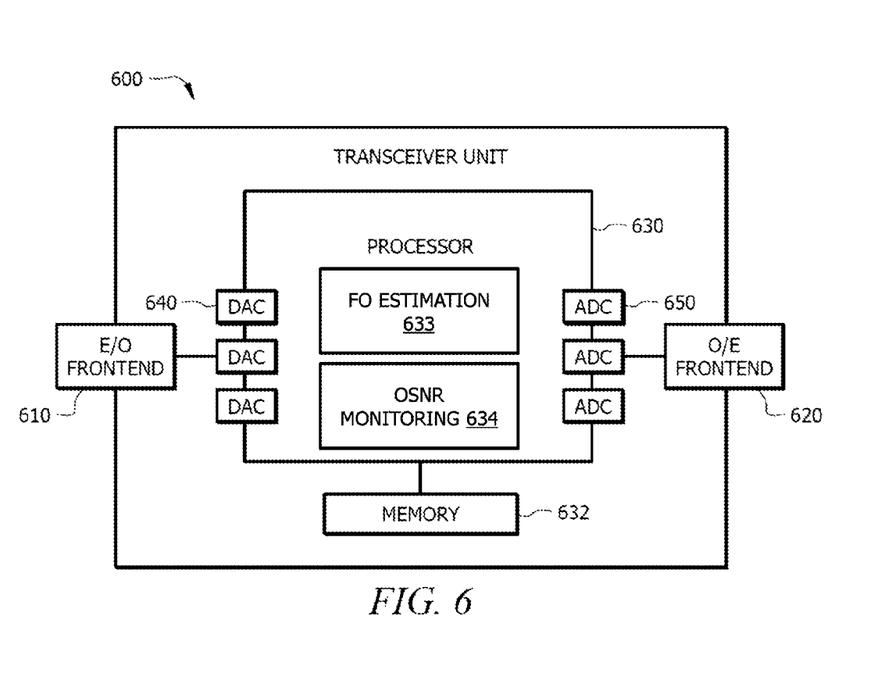
FIG. 6 is a schematic diagram of an embodiment of a transceiver unit.

FIG. 6 is a schematic diagram of an embodiment of a transceiver unit 600, which may be any device that transmits and/or receives optical signals with encoded data. For example, the transceiver unit 600 may be located in an optical communication system, which may implement transmitter 110 and the receiver 130. The transceiver unit 600 may also be configured to implement or support any of the schemes described herein, such as the multi-modulated-tone separation schemes 300 and 350, and the optical communication method 500. In some embodiments transceiver unit 600 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 600 is merely an example. Transceiver unit 600 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 600. For instance, the features/methods in the disclosure may be implemented using hardware, firmware, and/or software installed to run on hardware. As shown in FIG. 6, the transceiver unit 600 may comprise an electrical to optical (E/O) frontend 610 and/or an optical to electrical (O/E) frontend 620, which may convert an electrical signal to an optical signal for transmission in an OTN and/or receive an optical signal from the OTN and convert the optical signal to an electrical signal, respectively. A processor 630 may be coupled to the E/O frontend 610 and the O/E frontend 620 via a plurality of DACs 640 and ADCs 650, respectively, which may or may not be part of the processor 630. The DACs 640 may convert digital electrical signals generated by the processor 630 into analog electrical signals that may be fed into the E/O frontend 610. The ADCs 650 may convert analog electrical signals received from the O/E frontend 620 into digital electrical signals that may be processed by the processor 630. If the transceiver unit is at a receiving side, the processor 630 may comprise a FO estimation unit 633 for determination and tracking of FO and an OSNR monitoring module 634 for determination of OSNR. The processor 630 may be coupled to one or more multi-core processors and/or memory modules 632, which may function as data stores, buffers, etc. Processor 630 may be implemented as a general processor or may be part of one or more ASICs and/or DSPs. In an alternative embodiment, the FO estimation unit 633 may be implemented as instructions stored in the memory module 632, which may be executed by processor 630. The memory module 632 may comprise a cache for temporarily storing content, e.g., a Random Access Memory (RAM). Additionally, the memory module 632 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 600, at least one of the processor 630 and/or memory module 632 are changed, transforming the transceiver unit 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the transmitter 110 or the receiver 130) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. An apparatus comprising:
a frontend configured to:
  receive an optical signal modulated on a single optical carrier; and
  generate a digital electrical signal based on the optical signal; and
one or more processors coupled to the frontend and configured to:
  transform the digital electrical signal from a time domain to a frequency domain by applying a Fourier transform to generate a plurality of subcarrier sig- nals, wherein a frequency spectrum associated with the subcarrier signals comprises a plurality of frequency bands separated by spectral gaps;

estimate a frequency offset for a local oscillator based on powers of frequency bins around a spectral gap position of one of the spectral gaps;

generate a plurality of coded data symbols in the time domain based on the subcarrier signals and the frequency offset, wherein generating the coded data symbols comprises applying an inverse Fourier transform on each subcarrier signal; and decode the coded data symbols using a plurality of demodulation formats to generate a plurality of decoded data sub-streams, wherein different demodulation formats are applied on the coded data symbols with different symbol bit rates.

2. The apparatus of claim 1, wherein the one or more processors are further configured to convert the decoded data sub-streams into one data stream via parallel-to-serial conversion, and wherein the apparatus further comprises a transmitter coupled to the one or more processors and configured to transmit the data stream.

3. The apparatus of claim 1, wherein the one or more processors are further configured to estimate the frequency offset by accumulating the powers.

4. The apparatus of claim 1, wherein the spectral gap position is associated with a pre-determined first frequency bin, wherein a second frequency bin has a minimum power among the powers, and wherein the one or more processors are further configured to further estimate the frequency offset as a frequency difference between the first frequency bin and the second frequency bin.

5. The apparatus of claim 1, wherein the one or more processors are further configured to determine an optical signal-to-noise ratio (OSNR) based on the powers.

6. The apparatus of claim 5, wherein the one or more processors are further configured to further determine the OSNR by accumulating the powers.

7. The apparatus of claim 1, wherein the Fourier transform is a fast Fourier transform (FFT), wherein the inverse Fourier transform is an inverse FFT (IFFT), and wherein the plurality of demodulation formats comprises one or more of binary phase shift keying (BPSK) demodulation, quadrature phase shift keying (QPSK) demodulation, 8-level quadrature amplitude modulation (8QAM) demodulation, and 16QAM demodulation.

* * * * *